United States Patent
Haugsøen et al.

(10) Patent No.: US 8,056,298 B2
(45) Date of Patent: Nov. 15, 2011

(54) SUPPORT FOR ELEVATED MASS

(75) Inventors: Per Bull Haugsøen, Bergen (NO); Gunnar Foss, The Hague (NO)

(73) Assignee: Owec Tower AS, Bergen (NO)

( * ) Notice: Subject to any disclaimer, the term of this patent is extended or adjusted under 35 U.S.C. 154(b) by 656 days.

(21) Appl. No.: 11/795,339

(22) PCT Filed: Jan. 13, 2006

(86) PCT No.: PCT/NO2006/000015
§ 371 (c)(1),
(2), (4) Date: Jan. 11, 2008

(87) PCT Pub. No.: WO2006/078167
PCT Pub. Date: Jul. 27, 2006

(65) Prior Publication Data
US 2008/0290245 A1    Nov. 27, 2008

(30) Foreign Application Priority Data
Jan. 18, 2005 (NO) .................................. 20050271

(51) Int. Cl.
*E04H 12/00* (2006.01)
(52) U.S. Cl. ........ 52/651.09; 52/651.01; 52/40; 52/831; 416/DIG. 6
(58) Field of Classification Search ......... 52/40, 651.01, 52/651.09, 831; 416/DIG. 6; 405/203, 223.1, 405/224, 224.1, 224.2, 224.3, 227
See application file for complete search history.

(56) References Cited

U.S. PATENT DOCUMENTS

| | | | |
|---|---|---|---|
| 2,358,805 A * | 9/1944 | Horton | 220/567 |
| 3,462,907 A * | 8/1969 | Mckean | 52/847 |
| 3,834,168 A * | 9/1974 | Holley, Jr. | 405/224 |
| 4,106,301 A * | 8/1978 | Gerwick, Jr. | 405/224 |
| 4,423,985 A * | 1/1984 | Aagaard | 405/224 |
| 4,469,956 A | 9/1984 | D'Amato | |
| 4,688,967 A * | 8/1987 | Einstabland et al. | 405/222 |
| 4,906,139 A * | 3/1990 | Chiu et al. | 405/223.1 |
| 4,932,811 A * | 6/1990 | Folding | 405/227 |
| 6,227,803 B1 | 5/2001 | Shim | |

FOREIGN PATENT DOCUMENTS

| | | |
|---|---|---|
| DE | 3130585 | 2/1983 |
| JP | 2000272581 | 10/2000 |
| WO | WO 03/072428 A1 | 9/2003 |
| WO | WO 2005/040605 A1 | 5/2006 |

* cited by examiner

*Primary Examiner* — Robert Canfield
*Assistant Examiner* — Matthew Gitlin
(74) *Attorney, Agent, or Firm* — Patents+TMS, P.C.

(57) ABSTRACT

A support (4) for an elevated mass (6, 8), comprising at least three extended, mutually trussless supporting counts (14, 14', 14'', 14'''), and where the longitudinal axes of the supporting columns (14, 14', 14'', 14''') meet near the center of gravity (20) of the elevated mass (6, 8).

2 Claims, 4 Drawing Sheets

SUPPORT FOR ELEVATED MASS

This invention regards a constructional support for an elevated mass. More particularly, it regards a support comprising at least three extended supporting columns, where the longitudinal axes of the support columns meet near the centre of gravity of the elevated mass. The support is particularly suited for exposed installations such as offshore windmills.

The invention will be explained below with reference to an offshore windmill, as such a structure will be exposed to forces and deformations of the kind the invention is aimed at. The reference to a windmill does not imply any limitations of the scope and extent of the invention.

As a result of the way a windmill operates, the upper supporting structure of a windmill must have a slim design in order to avoid collisions with the wings of the windmill. From shore-based windmills, this slim construction, which is usually constituted by a pipe, is known to be coupled to a foundation in the ground.

When windmills are placed offshore, and often in relatively deep waters, it is not expedient to have one pipe projecting all the way from the foundation of the windmill to the machinery housing of the windmill.

Thus the supporting tower structure for known offshore windmills often comprises a tubular upper portion and a lower portion, which may be e.g. a trussed structure.

Wind, currents and waves that affect the support cause a relatively large horizontal displacement of the elevated mass, here represented by the rotor and machinery of the windmill.

The reason for this relatively large displacement is that, in addition to a displacement, during bending, a rotation is imparted to the upper part of the trussed structure, which projects from the windmill foundation to the slimmer part of the support. This direction of rotation coincides with the direction of the moment created by the forces of the weather about the foundation of the windmill.

Said rotation is transferred to the tubular column, the upper portion of which is then displaced further in the direction of the forces exerted by the weather.

Obviously, relatively large displacements of an elevated mass weighing several hundred tons cause complex patterns of fatigue and oscillations in the support.

The object of the invention is to remedy or reduce at least one of the disadvantages of prior art.

The object is achieved in accordance with the invention, by the characteristics given in the description below and in the following claims.

A support for an elevated mass and constructed in accordance with the invention comprises at least three extended, mutually trussless supporting columns. The supporting columns project up from the foundation of the support, in the direction of the elevated mass. The longitudinal axes of the supporting columns meet near the centre of gravity of the elevated mass.

The longitudinal axes of the supporting columns meeting near the centre of gravity of the elevated mass will allow horizontal forces affecting the elevated mass to be transferred to the foundation of the constructional support in the form of nearly pure pressures and tensile stresses in the supporting columns.

This pattern of forces in the supporting columns contributes to a significant reduction of the occurring shear forces, thereby eliminating the need to brace the supporting columns by use of e.g. diagonal struts.

Advantageously the upper portion of the support is a slim columnar structure where the columnar structure is rigidly connected to the upper portion of the supporting columns by a transition section.

A slim columnar structure will, among other things, allow the support to be adapted for use with a windmill where the rotor and the rest of the machinery of the windmill forms the elevated mass.

The transition section may be e.g. a stay structure that is known per se.

When subjected to lateral forces along the height of the support, which forces are caused by e.g. wind, currents or waves, the transition section undergoes a slight elastic displacement in the direction of the forces, as the forces exert torque about the foundation of the support.

At the same time, this deformation will result in the upper portion of the supporting column located on the side facing the wind, current or waves displacing further downwards in height due to its slanting position where it leans with the direction of the forces, compared to the upper portion of the supporting column located on the opposite side. The supporting column on this opposite side leans against the direction of the forces, and the supporting columns then assume a slightly S-shaped form.

A rotation is thereby imparted to the transition section, in the opposite direction of said torque about the foundation of the support.

Thus, when the support is deformed by lateral forces along its longitudinal extent, a rotation is imparted to the transition section because of the length of the supporting columns and their mutual inclination, which rotation, due to the length of the slim columnar structure, has displaced the elevated mass substantially the same horizontal distance as the elevated mass has been displaced by other deformations of the support, but in the opposite direction.

Other deformations of the support should be known to persons skilled in the art and so will not be described in any greater detail. However, we may add that torsional forces about axes in the horizontal plane are generally accommodated as described above, with the supporting columns being bent like an S, while torsional forces about axes in the vertical plane are accommodated by torsion about the respective supporting column of the slim columnar structure.

Thus the horizontal displacement of the elevated mass is insignificant when using a constructional support according to the invention. Forces acting at the point of intersection between the longitudinal axes of the supporting columns are transferred via the supporting columns, mainly in the form of axial tension. Thus the displacement due to these forces is relatively small. Forces acting laterally on the remaining height of the support will, as explained above, cause the elevated mass to be displaced against the direction of the forces in order to compensate for the displacement resulting from other deformations.

The structure of the invention is equally suitable for shore-based windmills.

In the following, a description is given of a preferred embodiment illustrated on the accompanying drawings, in which.

Figure 1:
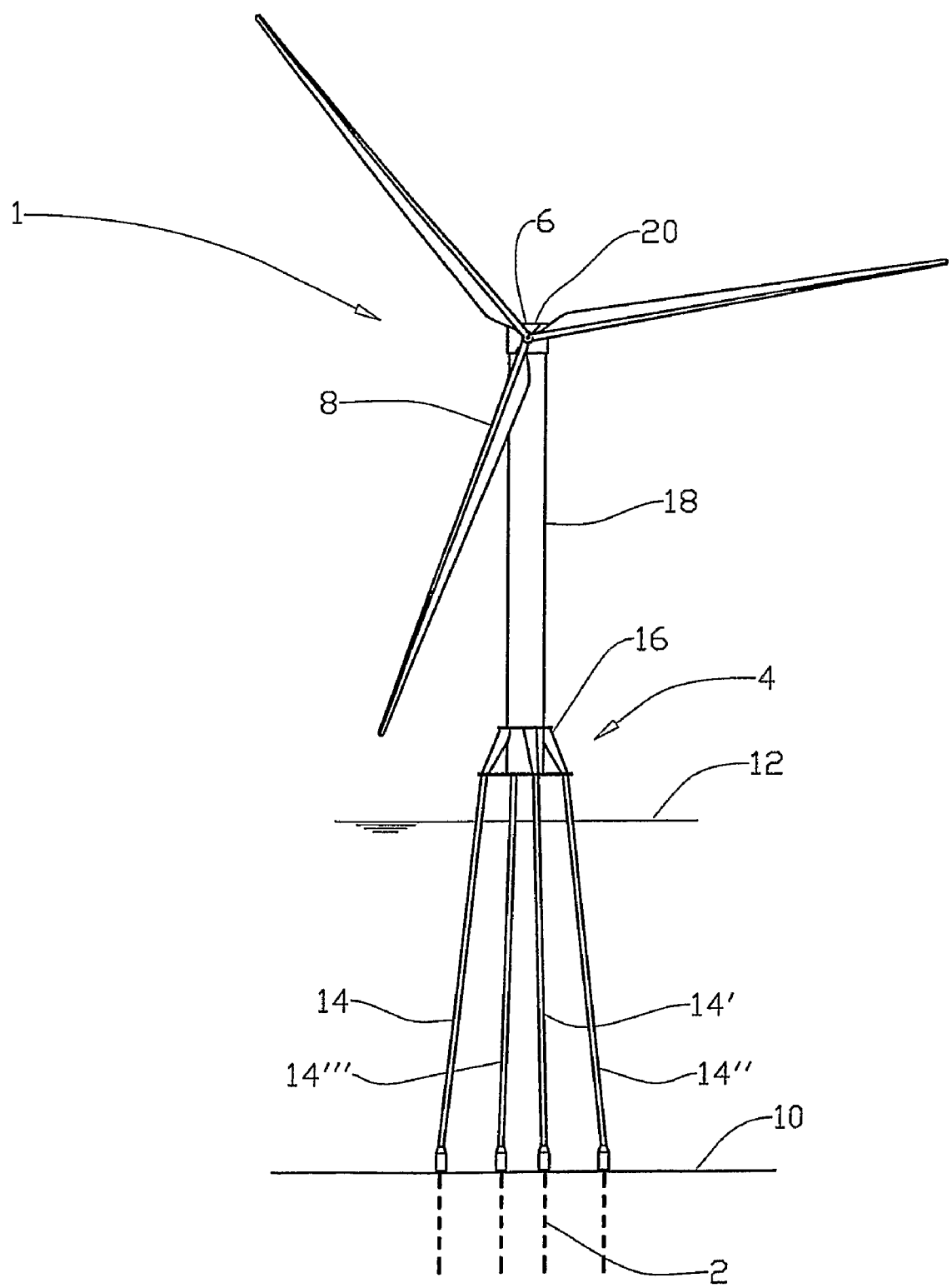
FIG. 1 shows a windmill where the lower portion of the support consists of supporting columns.

In the drawings, reference number 1 denotes a windmill comprising a foundation 2, a constructional support 4, machinery 6 and a wind turbine 8. The machinery 6 and the wind turbine 8 form an elevated mass. The foundation 2 may comprise piles or suction anchors (not shown) of a type that is known per se.

The windmill 1 is mounted on the seabed 10; as part of the support 4 is located below the surface 12 of the sea.

The support 4 comprises four slim supporting columns 14, 14', 14", 14''' projecting from the foundation 2 up to a transition section 16. A slim columnar structure 18 in the form of a pipe rises from the transition section 16 to the machinery 6.

Figure 2:
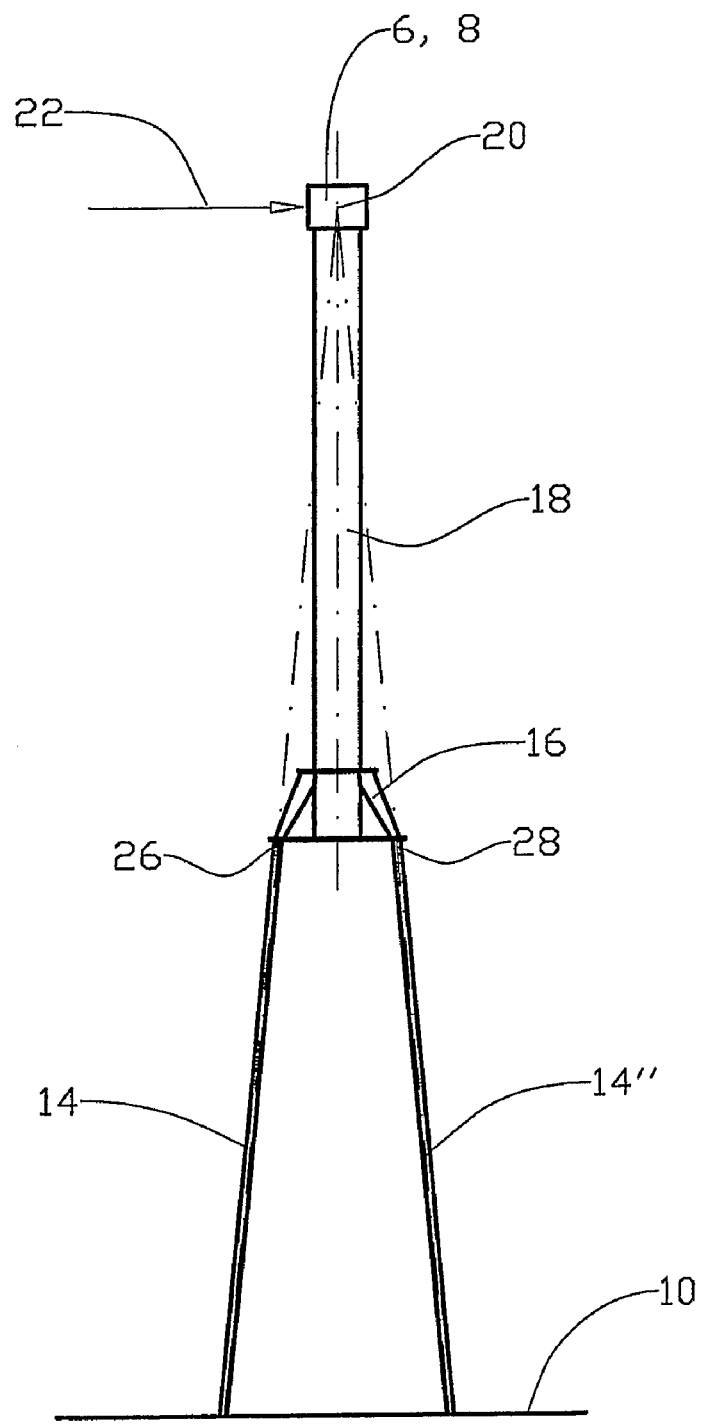
FIG. 2 is a schematic view of a support according to the invention.

The longitudinal axes of the supporting columns 14-14''' meet near or at the centre of gravity 20 of the machinery 6 and the wind turbine 8, see FIG. 2. External lateral forces, represented here by arrow 22, acting on the support 4 at the centre of gravity 20 are transferred to the foundation 2, mainly in the form of tension and compressive stress in the supporting columns 14-14'''.

Figure 3:
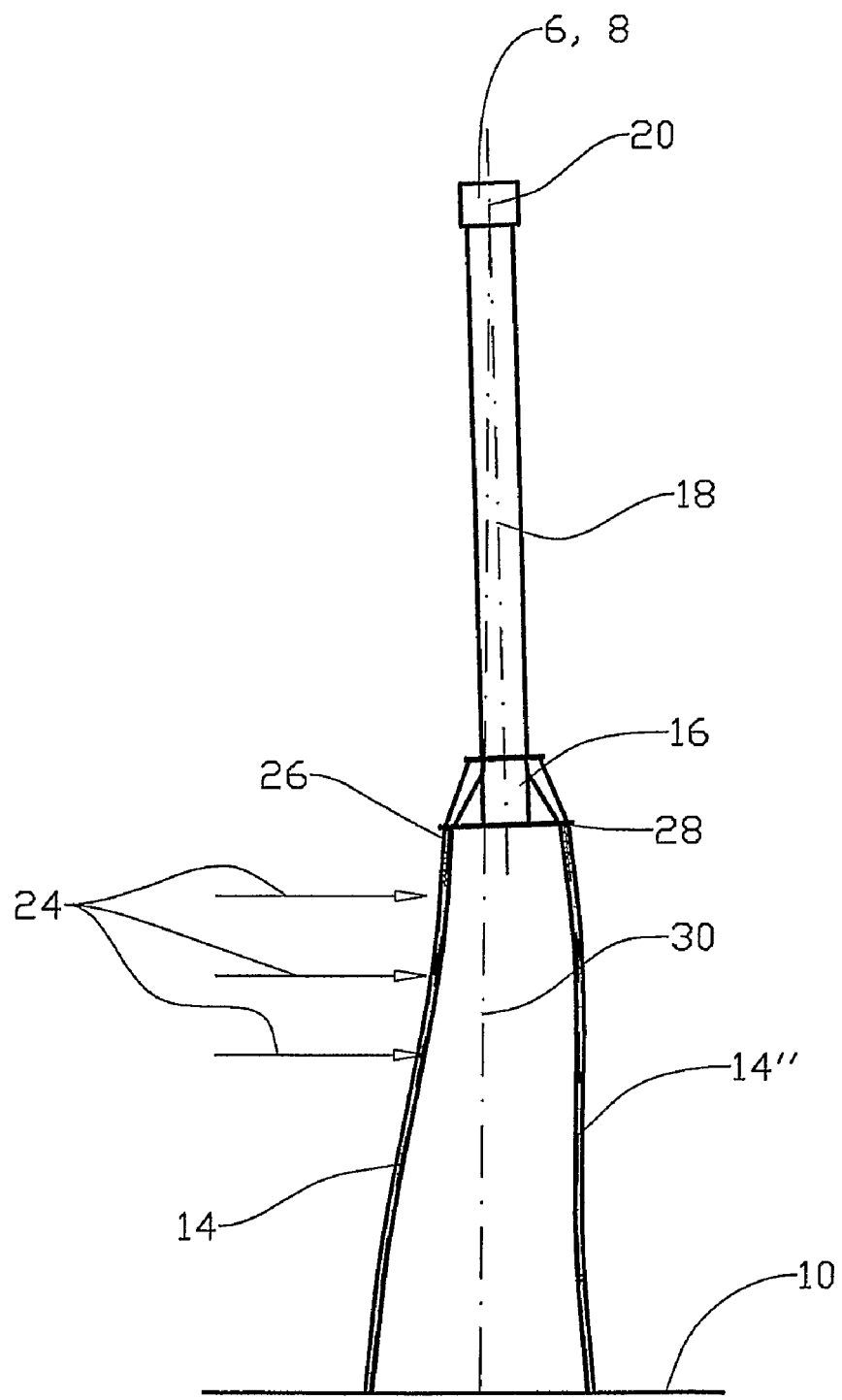
FIG. 3 shows the same as FIG. 2, but here the support has been deformed by forces of the weather.

FIGS. 2 and 3 show supporting columns 14 and 14" only.

The transition section 16, which consists of a stay connection of a type that is known per se, is quite rigidly mounted between the supporting columns 14-14''' and the slim columnar structure 18.

The transition section 16 extends between the supporting columns 14-14''', which due to their direction towards the centre of gravity 20 are spaced apart at the transition section 16.

When the support 4 is affected by lateral forces caused by wind, current or waves, represented here by arrows 24 in FIG. 3, the transition section 16 is displaced slightly in the direction of the arrows 24 due to the bending moment that occurs about the foundation 2.

At the same time, this displacement will cause the upper portion 26 of the supporting column 14 located on the side facing the wind, current or waves to displace further downwards in height due to its slanting position where it leans with the direction of the forces, compared to the upper portion 28 of the supporting column 14". The supporting column 14" is located on the opposite side of the support 4, leaning against the direction of the forces.

Thus a rotation about a horizontal axis is imparted to the transition section 16, which rotation has the opposite direction of said torque about the foundation 2 of the support 4.

Thus, when the support 4 is deformed by lateral forces along its longitudinal extent, a rotation is imparted to the transition section 16 due to the length of the supporting columns 14-14''' and their mutual inclination, which rotation, due to the length of the slim columnar structure 18, has displaced the elevated mass 6, 8 substantially the same horizontal distance as the elevated mass 6, 8 has been displaced by other deformations of the support 4, but in the opposite direction. Consequently the overall displacement decreases up along the slim columnar structure 18 as the distance to the transition section 16 increases.

A vertical centre line 30 in FIG. 3 shows the centre of the support prior to deformation.

The rigid mounting of the supporting columns 14-14''' to the foundation 2 and the transition section 16 causes the supporting columns 14-14''' to assume a slight S-shape during the lateral deformation, as indicated in FIG. 3. It is also possible (not shown) to connect the supporting columns 14-14''' to the foundation 2 and the transition section 16 via articulated links.

Figure 4:
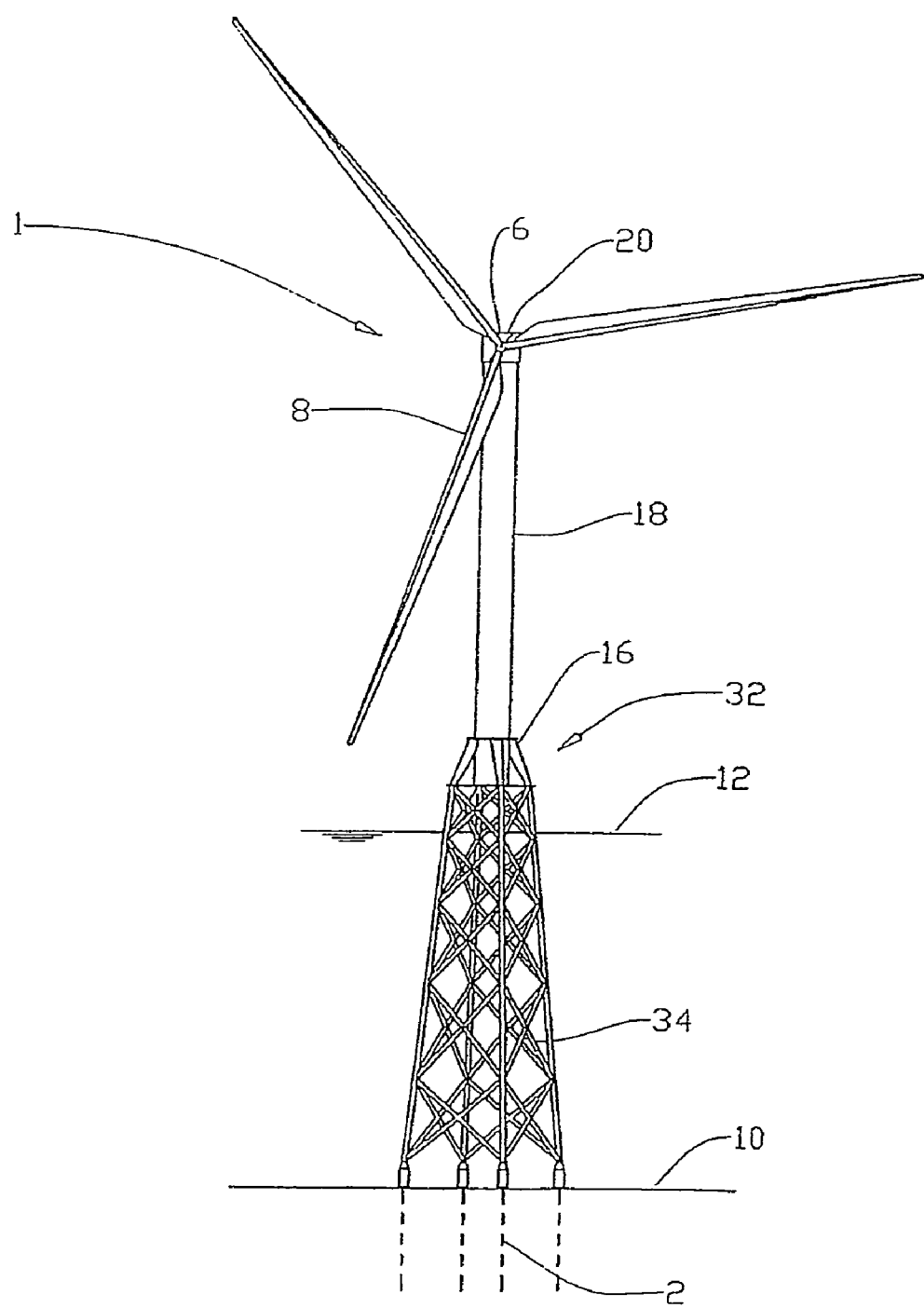
FIG. 4 shows a windmill provided with a support according to prior art.

FIG. 4 shows a constructional support 32 according to prior art, where the lower portion of the support consists of truss work 34.

The invention claimed is:

1. A support for an elevated mass wherein the elevated mass has a center of gravity, the support comprising:

at least three extended, mutually trussless supporting columns wherein the supporting columns have upper portions wherein the supporting columns have longitudinal axes that extend in a direction towards the center of gravity of the elevated mass;

a slim columnar structure extending from the upper portions of the supporting columns wherein the slim columnar structure has a length defined between a first end and second end wherein the second end is positioned opposite to the first end wherein the elevated mass is positioned at the second end of the slim columnar structure; and a transition section rigidly mounted between the upper portions of the supporting columns and the first end of the slim columnar structure wherein the upper portions of the supporting columns are spaced apart at the transition section wherein the transition section extends between the upper portions of the supporting columns wherein the longitudinal axes of the supporting columns meet substantially at the center of gravity of the elevated mass positioned at the second end of the slim columnar structure.

2. The support of claim 1 wherein when a rotation is imparted to the transition section and thereby the slim columnar structure, the support is laterally deformed due to a length and a mutual inclination of the supporting columns wherein the rotation, due to the length of the slim columnar structure, displaces the elevated mass substantially a same horizontal distance in a first direction as the elevated mass is displaced by other deformations of the support in a second direction wherein the second direction is opposite to the first direction.

* * * * *